(12) United States Patent
Spannhake et al.

(10) Patent No.: US 9,059,584 B2
(45) Date of Patent: Jun. 16, 2015

(54) CIRCUIT ARRANGEMENT FOR LIMITING THE OVERVOLTAGE OF AN EXCITATION WINDING OF A SYNCHRONOUS MACHINE HAVING RAPID DE-EXCITATION

(75) Inventors: Stefan Spannhake, Markgroeningen (DE); Jochen Fassnacht, Calw (DE); Hans-Peter Mueller, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 356 days.

(21) Appl. No.: 13/577,197

(22) PCT Filed: Jan. 12, 2011

(86) PCT No.: PCT/EP2011/050306
§ 371 (c)(1),
(2), (4) Date: Jan. 9, 2013

(87) PCT Pub. No.: WO2011/095375
PCT Pub. Date: Aug. 11, 2011

(65) Prior Publication Data
US 2013/0128394 A1 May 23, 2013

(30) Foreign Application Priority Data
Feb. 5, 2010 (DE) .......................... 10 2010 001 626

(51) Int. Cl.
| H02H 7/00 | (2006.01) |
|---|---|
| H02H 7/08 | (2006.01) |
| E05B 47/00 | (2006.01) |
| E05B 47/02 | (2006.01) |
| H01F 7/16 | (2006.01) |
| E05B 63/14 | (2006.01) |
| E05B 65/00 | (2006.01) |
| H01F 7/08 | (2006.01) |

(52) U.S. Cl.
CPC .......... *H02H 7/0805* (2013.01); *E05B 47/0002* (2013.01); *E05B 47/0004* (2013.01); *E05B 47/026* (2013.01); *E05B 63/14* (2013.01); *E05B 65/0075* (2013.01); *E05B 2047/0065* (2013.01); *E05B 2047/0093* (2013.01); *H01F 7/1607* (2013.01); *H01F 2007/086* (2013.01)

(58) Field of Classification Search
None
See application file for complete search history.

(56) References Cited

U.S. PATENT DOCUMENTS

| 4,118,749 A * | 10/1978 | Matuzaki et al. | 361/33 |
| 4,930,034 A * | 5/1990 | Kusserow et al. | 361/19 |
| 8,022,658 B2 * | 9/2011 | Ide | 318/802 |

(Continued)

FOREIGN PATENT DOCUMENTS

| EP | 0738037 A1 * | 10/1996 |
| EP | 1705794 A2 * | 9/2006 |

(Continued)

*Primary Examiner* — Eduardo Colon Santana
*Assistant Examiner* — Devon Joseph
(74) *Attorney, Agent, or Firm* — Kenyon & Kenyon LLP

(57) ABSTRACT

A circuit arrangement for de-exciting an excitation winding of a synchronous machine in the event of a fault, including a control circuit for controlling a current flow through the excitation winding, it being possible to apply a positive control voltage to the excitation winding for excitation and a negative control voltage for rapid de-excitation, and including a protective circuit which is parallel-connected to the excitation winding and which does not permit a current flow over the protective circuit in the event of rapid de-excitation and which forms a current path for limiting the voltage and de-exciting the excitation winding if at least one connecting line between the control circuit and the excitation winding is interrupted.

11 Claims, 2 Drawing Sheets

(56) References Cited

U.S. PATENT DOCUMENTS

2005/0012495 A1* 1/2005 Kadner ............... 323/364
2011/0298430 A1* 12/2011 Platero Gaona et al. ....... 322/59

FOREIGN PATENT DOCUMENTS

EP     2063524 A1 *  5/2009
EP     2036196 B1 * 12/2013

* cited by examiner

CIRCUIT ARRANGEMENT FOR LIMITING THE OVERVOLTAGE OF AN EXCITATION WINDING OF A SYNCHRONOUS MACHINE HAVING RAPID DE-EXCITATION

FIELD OF THE INVENTION

The present invention relates to a circuit arrangement for de-exciting an excitation winding of a synchronous machine.

BACKGROUND INFORMATION

For reasons of efficiency and/or manufacturing costs, externally excited synchronous machines are used as the drive system for electric vehicles. Electric machines of this type include an excitation winding which has very high inductances of more than 1 henry and in which energy of over 100 joules may be stored.

SUMMARY OF THE INVENTION

The exemplary embodiments and/or exemplary methods of the present invention is intended to provide a circuit arrangement for de-exciting an excitation winding of a synchronous machine in the event of a fault, including a control circuit for controlling a current flow through the excitation winding, it being possible to apply a positive control voltage to the excitation winding for excitation and a negative control voltage for rapid de-excitation, and including a protective circuit which is parallel-connected to the excitation winding and which does not permit a current flow over the protective circuit in the event of rapid de-excitation and which forms a current path for limiting the voltage and de-exciting the excitation winding if at least one connecting line between the control circuit and the excitation winding is interrupted.

The high energy stored in the excitation winding results in the fact that voltages of multiple kilovolts may occur at the interruption point if the circuit between the control circuit and the excitation winding is abruptly interrupted, and these voltages may result in an electric arc which poses a risk of fire and injury. Abrupt interruptions of this type may be caused, for example, by the fact that a plug contact between the control circuit and the excitation winding is removed during ongoing operation, or by the fact that the plug contacts loosen automatically ("shake free") as a result of shocks during ongoing operation. An abrupt interruption of a connecting line between the control circuit and the excitation winding may also occur in the event of a crash.

Since not only a positive control voltage for excitation but also a negative control voltage for rapid de-excitation must be applicable to the excitation winding, it is important for the protective circuit to be designed in such a way that it safely prevents a current flow over the protective circuit in the event of a rapid de-excitation, i.e., if a negative supply voltage is applied to the excitation winding. If a connecting line between the control circuit and the excitation winding is interrupted, however, a current path located parallel to the excitation winding opens, via which the energy stored in the excitation winding may selectively be discharged.

Since the control circuit is situated spatially separated from the excitation winding, the excitation winding may be connected to and disconnected from the control circuit via a plug connection having at least two plug contacts, according to one specific embodiment of the present invention. In an electric vehicle, the control circuit is, for example, frequently integrated into a superordinate power electronic unit, the excitation winding, in contrast, being situated spatially separated therefrom on a rotor of the synchronous machine.

According to one specific embodiment of the present invention, the protective circuit has a varistor (voltage-dependent resistor) or, alternatively, a suppressor diode or a gas discharge tube, which has a breakdown voltage which is higher than a maximum absolute value of the negative control voltage. A component of this type, which is parallel-connected to the excitation winding, is operated below its breakdown voltage in the event of rapid de-excitation and thereby prevents a current flow. If a connecting line between the control circuit and the excitation winding is interrupted, the voltage at the excitation winding continues to rise until the breakdown voltage of the component is exceeded, the component becomes conductive and thus permits a current flow over the component. The energy stored in the excitation winding is then "burned" in the resistor of the excitation winding as well as in the varistor or the suppressor diode or the gas discharge tube.

According to another specific embodiment of the present invention, the protective circuit has a free-wheeling branch which includes at least one series connection of a free-wheeling diode and a controllable switching element, the switching element being activated in such a way that a current flow is permitted over the free-wheeling diode if at least one connecting line between the control circuit and the excitation winding is interrupted. The mere use of a free-wheeling diode is not possible, since this would also permit a current flow over the protective circuit during the operating condition of a rapid de-excitation. However, this flow may be prevented by a correspondingly controlled switching element, which may be designed, for example, as a transistor or a thyristor.

According to one specific embodiment of the present invention, an additional resistor may also be connected serially to the free-wheeling diode which "burns" the energy to a large extent in the event of a fault.

To provide for the activation of the switching element using the simplest possible circuitry arrangement, the activation may be carried out, for example with the aid of a voltage divider which is parallel-connected to the free-wheeling branch and which is dimensioned in such a way that the switching element is fully conductive if at least one connecting line between the control circuit and the excitation winding is interrupted.

According to one specific embodiment of the present invention, the voltage divider has a resistor branch which includes a series connection of at least two resistors, a center tap between the resistors being connected to a control terminal of the switching element.

One specific embodiment of the present invention provides that a diode branch is parallel-connected to the resistor branch and has at least one series connection of at least one Zener diode and at least one resistor, a center tap between the Zener diode and the resistor being connected to the center tap between the resistors of the resistor branch via a diode in the reverse direction. Due to the additional use of a Zener diode, it may be achieved that the protective circuit safely operates as a freewheel, not only if the supply lines to the excitation coil are interrupted but also in the case of an otherwise induced overvoltage at the excitation winding. This functionality may be alternatively achieved by parallel-connecting a varistor to the resistor branch.

All resistors within the protective circuit may be designed as ohmic resistors or as other components having a corresponding ohmic portion.

According to one specific embodiment of the present invention, the center tap between the resistors of the resistor branch is connected to a third plug contact of the plug connection between the control circuit and the excitation winding, the plug contact being designed as a first-to-make last-to-break contact. The earliest possible through-switching of the switching element, and thus the fastest possible de-excitation of the excitation winding, may thus be ensured by removing the connector.

According to another specific embodiment of the present invention, the plug connection between the control circuit and the excitation winding is designed to be touch-proof, so that in addition to avoiding an electric arc, risk of injury by touching the contacts after removing the connector is also avoided.

According to another specific embodiment of the present invention, a comparator is connected upstream from the switching element, the comparator comparing the voltage at the excitation winding with a predefined threshold value and thus detecting overvoltage.

Additional features and advantages of specific embodiments of the present invention are derived from the following description with reference to the attached figures.

DETAILED DESCRIPTION

Figure 1:
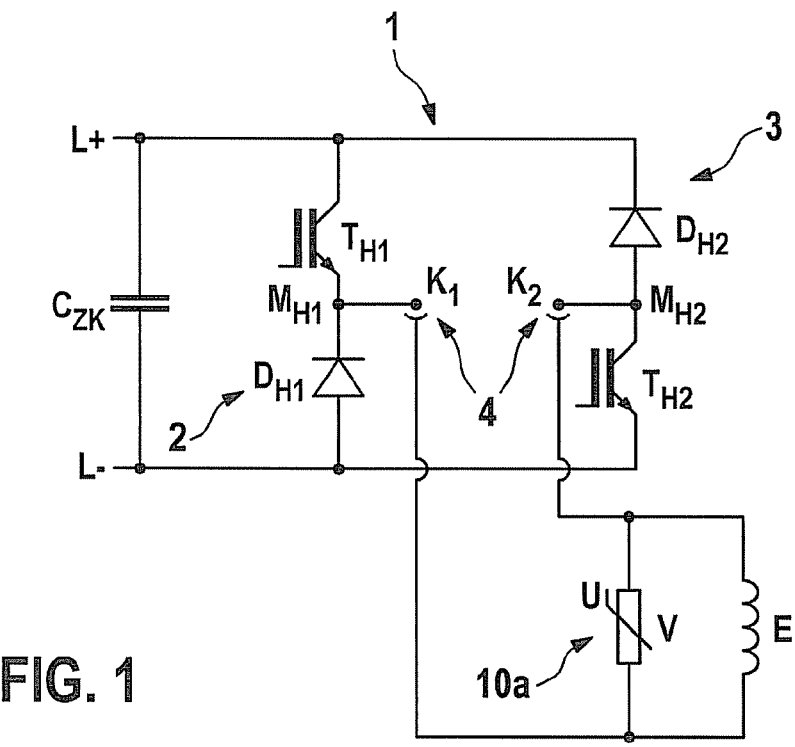
FIG. 1 shows a circuit arrangement according to the present invention according to a first specific embodiment.

In the figures, identical or functionally equivalent components are marked by the same reference numerals in each case.

FIG. 1 shows a circuit arrangement according to the present invention, in which an excitation winding E of a synchronous machine, which is otherwise not illustrated, is connected via a control circuit 1 to a voltage source in the form of a DC-link capacitor $C_{ZK}$. The control circuit has two parallel control branches, each of which is connected between a positive supply rail L+ and a negative supply rail L−. A first control branch 2 has a series connection of a first controllable control switching element in the form of a first control transistor $T_{H1}$ and a first diode $D_{H1}$, the collector terminal of first control transistor $T_{H1}$ being electrically connected to positive supply rail L+, the emitter terminal of first control transistor $T_{H1}$ being electrically connected to the cathode of first diode $D_{H1}$, and the anode of first diode $D_{H1}$ being electrically connected to negative supply rail L−. A second control branch 3 has a series connection of a second controllable control switching element in the form of a second control transistor $T_{H2}$ and a second diode $D_{H2}$, the cathode of second diode $D_{H2}$ being electrically connected to positive supply rail L+, the anode of second diode $D_{H2}$ being electrically connected to the collector terminal of second control transistor $T_{H2}$, and the emitter terminal of second control transistor $T_{H2}$ being electrically connected to negative supply rail L−. The gate terminals of control transistors $T_{H1}$ and $T_{H2}$ are each connected to a control unit, which is not illustrated and which controls a current flow through excitation winding E by suitably activating control transistors $T_{H1}$ and $T_{H2}$.

Center taps $M_{H1}$ and $M_{H2}$, to which excitation winding E is connected, are each provided between control transistor $T_{H1}$, $T_{H2}$ and diode $D_{H1}$, $D_{H2}$. A plug connection 4 is provided between control circuit 1 and excitation winding E, which, in the illustrated exemplary embodiment, has two plug contacts K1 and K2, via which excitation winding E may be electrically connected to and disconnected from first center tap $M_{H1}$ and second center tap $M_{H2}$.

By through-switching the two control transistors $T_{H1}$ and $T_{H2}$, a positive control voltage is applied to excitation winding E, so that the exciting current rises. By blocking one of the two control transistors $T_{H1}$ or $T_{H2}$ while the other control transistor remains conductive, a short circuit of excitation winding E is produced via the conductive control transistor and the diode of the respective other control branch, which permits a freewheeling of the current in excitation winding E and causes an instantaneous exciting current to be maintained. If both control transistors $T_{H1}$ and $T_{H2}$ are blocked, a negative control voltage is present at excitation winding E, which results in a rapid de-excitation, i.e., in a rapid lowering of the exciting current.

As illustrated, the control switching elements of control circuit 1 may be designed as bipolar transistors; however, they may, of course, also be provided by other suitable components, for example field effect transistors.

According to a first specific embodiment of the present invention, a protective circuit 10a may be parallel-connected to excitation winding E in the form of a voltage-dependent resistor V, which is also frequently referred to as a varistor. Varistor V is dimensioned in such a way that its breakdown voltage, which is frequently also referred to as threshold voltage or starting voltage, is above the maximum absolute value of the negative control voltage. A varistor may be used whose breakdown voltage is approximately 20 to 50 volts above the maximum control voltage. This ensures that the varistor is not conductive in the event of a rapid de-excitation, i.e., if negative control voltage is present at excitation winding E, and it is therefore possible in the first place to apply a negative control voltage to excitation winding E. If the circuit between control circuit 1 and excitation winding E is interrupted, e.g., as a result of manually opening plug connection 4 or automatically opening plug connection 4 as a result of shocks and vibrations during operation ("shaking free"), or also as a result of a crash, the voltage at the excitation winding continues to rise until the breakdown voltage of varistor V is exceeded, varistor V consequently becomes conductive, and a current path running parallel to excitation winding E thus forms for the purpose of de-exciting excitation winding E. The energy stored in excitation winding E is then "burned," so to speak, in the resistor of excitation winding E and in varistor V.

In addition, at last one further resistor, which is not illustrated, may be series-connected to varistor V, at which energy may also be dissipated in the event of a fault.

The voltage at excitation winding E is thus limited to a value in the range of the breakdown voltage of varistor V. If all connectors, lines and housings affected are designed for a corresponding electric strength, safe operation may be ensured in this way. In addition, plug connection 4 may also be advantageously designed to be touch-proof.

The first specific embodiment of the present invention was described by way of example for the parallel connection of a varistor. However, a gas discharge tube or a suppressor diode may also be used instead of the varistor.

According to a second specific embodiment of a protective circuit according to the present invention (FIG. 2), a freewheeling branch 5 is parallel-connected to excitation winding E, which includes at least one series connection of a freewheeling diode $D_S$ and a controllable switching element $T_S$, which is designed as a switching transistor $T_S$, for example.

The collector terminal of switching transistor $T_S$ is electrically connected to second center tap $M_{H2}$ of second control branch 3 of control circuit 1, and the emitter terminal is electrically connected to the anode of free-wheeling diode $D_S$. The cathode of free-wheeling diode $D_S$ is electrically connected to first center tap $M_{H1}$ of first control branch 2 of control circuit 1. An additional resistor may be provided in series to free-wheeling diode $D_S$. As an alternative to the illustrated configuration, free-wheeling diode $D_S$ may also be connected together with the additional resistor in the collector branch of switching transistor $T_S$, if necessary (see FIG. 3).

Switching transistor $T_S$ must be activated in such a way that it switches through if at least one connecting line between control circuit 1 and excitation winding E is interrupted, and a current flow over free-wheeling diode $D_S$ is thus enabled.

Figure 2:
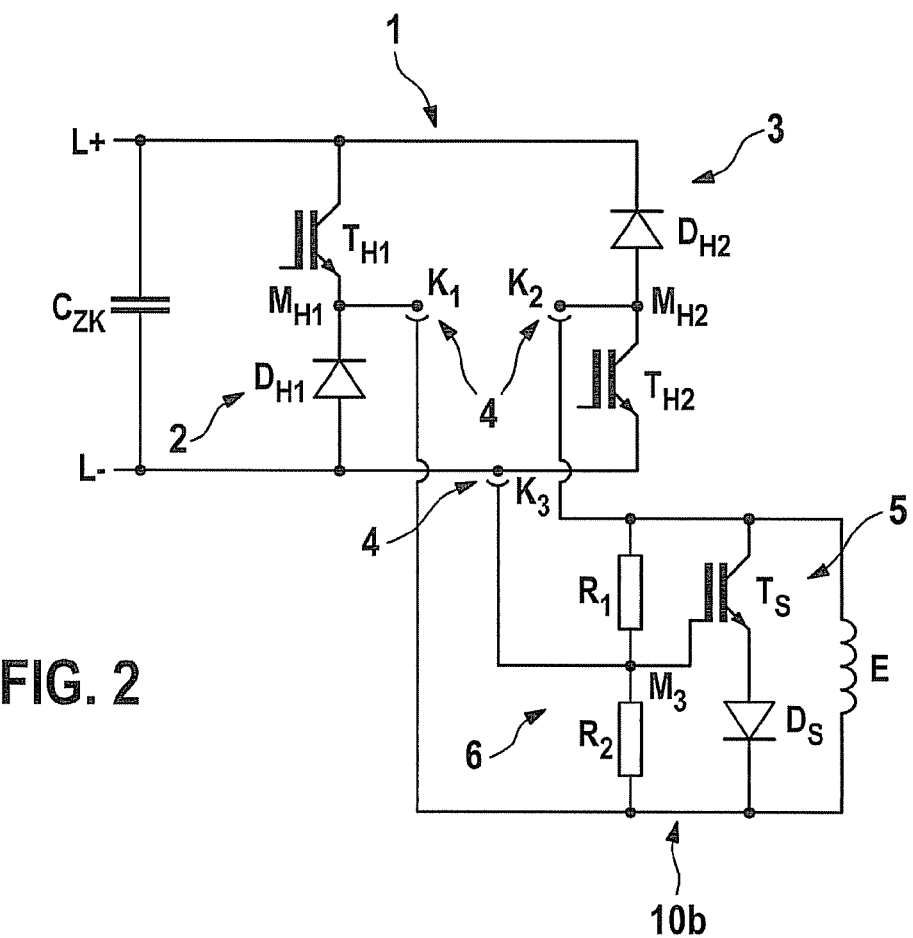
FIG. 2 shows a circuit arrangement according to the present invention according to a second specific embodiment.

This is achieved by the fact that a voltage divider is parallel-connected to free-wheeling branch 5, which, in the simplest case illustrated in FIG. 2, has a resistor branch 6 which includes a series connection of at least two resistors $R_1$ and $R_2$. A center tap $M_3$ between resistors $R_1$ and $R_2$ is electrically connected to negative supply rail L−, on the one hand, and to the gate terminal of switching transistor $T_S$, on the other hand. Resistors $R_1$ and $R_2$ are dimensioned in such a way that, after the connection between negative supply rail L− and the gate terminal of switching transistor $T_S$ is disconnected, the switching transistor switches safely through and is fully conductive. In this specific embodiment, free-wheeling branch 5 and resistor branch 6 together form a switching circuit 10b.

The electrical connection between center tap $M_3$ and negative supply rail L− is advantageously implemented with the aid of a third plug contact K3 of plug connection 4, third plug contact K3 being designed as a first-to-make last-to-break contact. This achieves the fact that the connection between center tap $M_2$ and negative supply rail L− is disconnected by removing the connector at a point in time before plug contacts K1 and K2, whereby switching transistor $T_S$ switches through at an early point, and a fast de-excitation of the excitation winding is ensured.

Figure 3:
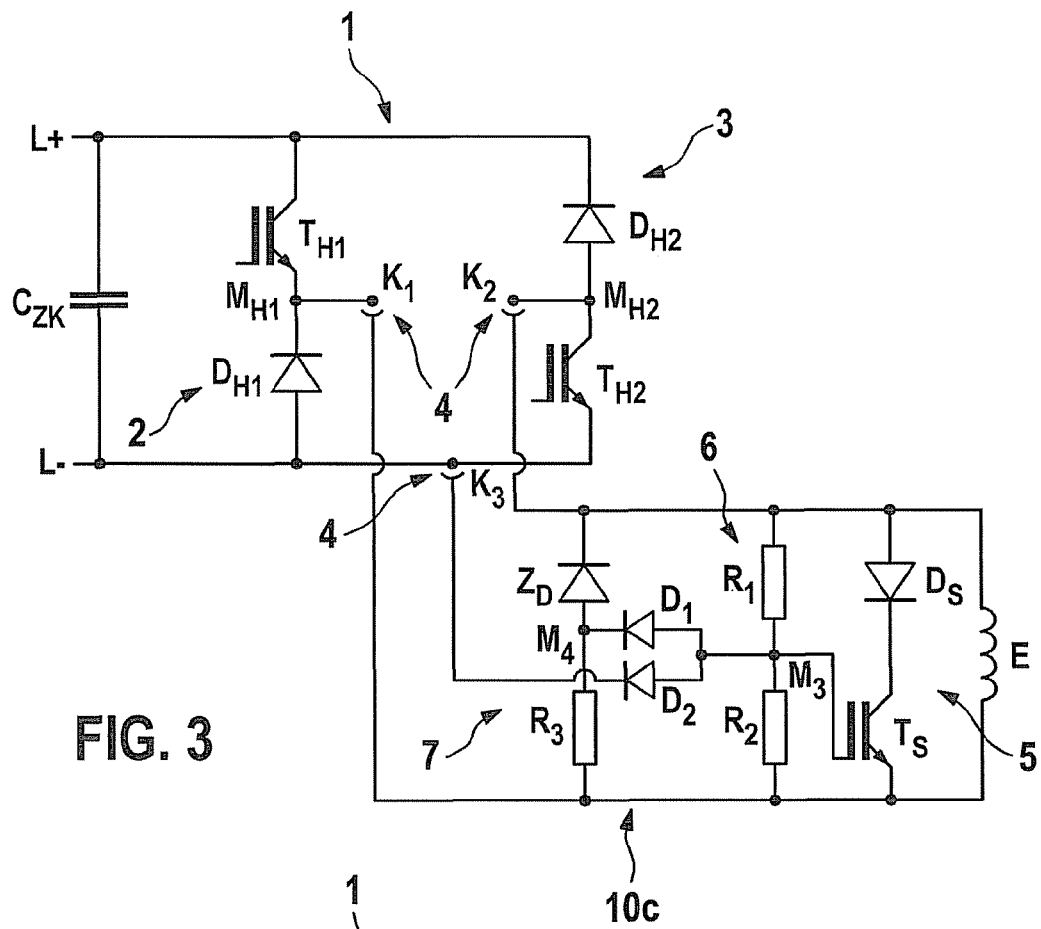
FIG. 3 shows a circuit arrangement according to the present invention according to a third specific embodiment.

FIG. 3 shows a third specific embodiment of a protective circuit according to the present invention. This specific embodiment differs from the one illustrated in FIG. 2 in that a diode branch 7 is parallel-connected to resistor branch 6 and includes at least one series connection of at least one Zener diode $Z_D$ and at least one resistor $R_3$, a center tap $M_4$ between Zener diode $Z_D$ and resistor $R_3$ being electrically connected to center tap $M_3$ between resistors $R_1$ and $R_2$ of resistor branch 6 via a first diode $D_1$ in the reverse direction. Zener diode $Z_D$ and resistor $R_3$ are dimensioned in such a way that a voltage divider, which includes Zener diode $Z_D$, resistors $R_1$, $R_2$ and $R_3$ as well as diode $D_1$, through-switches switching transistor $T_S$ if an overvoltage is present at excitation winding E. In this specific embodiment, resistor branch 6 and diode branch 7 together form a protective circuit 10c.

In addition, a second diode $D_2$ is connected in the reverse direction in the connecting line between plug contact K3 and center tap $M_3$ of resistor branch 6. Diodes $D_1$ and $D_2$ together perform the function of an OR link of transistor trigger conditions. Switching transistor $T_S$ thus switches through when the voltage at Zener diode $Z_D$ is too high or when the connecting line between control circuit 1 and excitation winding E is interrupted, e.g., by disconnecting plug connection 4.

Figure 4:
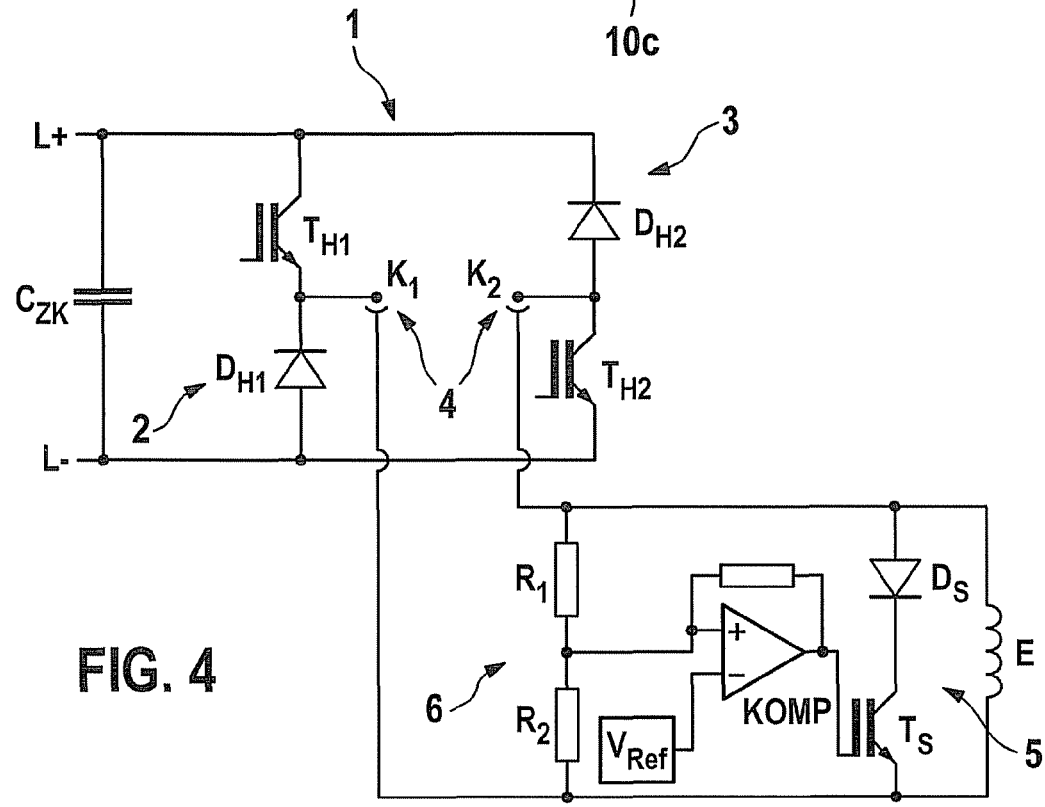
FIG. 4 shows a circuit arrangement according to the present invention according to a fourth specific embodiment.

The parallel connection of diode branch 7 may thus ensure that the protective circuit generally operates safely as a free-wheel in the event of an overvoltage at the excitation winding. Alternatively, this may also be achieved by parallel-connecting a varistor to resistor branch 6 instead of diode branch 7. An overvoltage at the excitation winding may also be detected with the aid of a comparator. FIG. 4 shows a possible circuit arrangement having a comparator.

Instead of a diode branch according to FIG. 3, a comparator KOMP is provided in which the non-inverting input is connected to center tap $M_3$ between resistors $R_1$ and $R_2$ of resistor branch 6, and a reference voltage $V_{ref}$ is applied to the inverting input. The output of comparator KOMP is connected to the gate terminal of switching transistor $T_S$, so that switching transistor $T_S$ switches through as soon as the voltage at the non-inverting input of comparator KOMP is higher than reference voltage $V_{ref}$. By suitably dimensioning the resistors and setting the reference voltage, this ensures that the comparator reliably detects an overvoltage at excitation winding E, i.e., an exceedance of a predefined threshold value, and prompts the switching transistor to switch through.

To not only avoid an electric arc but to also prevent the risk of injury by touching the contacts on plug connection 4 after the connector is removed, it is advantageous to design plug connection 4 to be touch-proof.

What is claimed is:

1. A circuit arrangement for de-exciting an excitation winding of a synchronous machine in the event of a fault, comprising:
   a control circuit for controlling a current flow through the excitation winding, wherein a positive voltage is appliable to the excitation winding for excitation and a negative control voltage for rapid de-excitation; and
   a protective circuit which is parallel-connected to the excitation winding, which does not permit a current flow over the protective circuit in the event of rapid de-excitation, and which forms a current path for limiting the voltage and de-exciting the excitation winding if at least one connecting line between the control circuit and the excitation winding is interrupted;
   wherein the protective circuit has a free-wheeling branch which includes at least one series connection of a free-wheeling diode and a controllable switching element,
   wherein the switching element is a transistor or a thyristor, and a control signal for the switching element is generated with the aid of a voltage divider which is parallel-connected to the free-wheeling branch,
   wherein the voltage divider has a resistor branch, and
   wherein a diode branch is parallel-connected to the resistor branch and includes at least one series connection of at least one Zener diode and at least one resistor.

2. The circuit arrangement of claim 1, wherein the excitation winding is connectable to and disconnectable from the control circuit via a plug connection having at least two plug contacts.

3. The circuit arrangement of claim 2, wherein the plug connection is configured to be touch-proof.

4. The circuit arrangement of claim 1, wherein the protective circuit has a varistor or a gas discharge tube or a suppressor diode, which has a breakdown voltage which is higher than a maximum absolute value of the negative control voltage.

5. The circuit arrangement of claim 1, wherein the switching element is activated so that a current flow over the free-wheeling diode is enabled if at least one connecting line between the control circuit and the excitation winding is interrupted.

6. The circuit arrangement of claim 5, wherein the voltage divider is dimensioned so that the switching element is fully conductive if at least one connecting line between the control circuit and the excitation winding is interrupted.

7. The circuit arrangement of claim 6, wherein the resistor branch includes a series connection of at least two resistors, a center tap between the resistors being connected to a control terminal of the switching element.

8. The circuit arrangement of claim 7, wherein a center tap between the Zener diode and the resistor is connected to the center tap between the resistors of the resistor branch via a diode in the reverse direction.

9. The circuit arrangement of claim 7, wherein a varistor is parallel-connected to the resistor branch.

10. The circuit arrangement of claim 7, wherein the center tap between the resistors of the resistor branch is connected to a third plug contact of the plug connection, which is configured as a first-to-make last-to-break contact.

11. The circuit arrangement of claim 5, wherein a comparator which compares the voltage at the excitation winding with a predefined threshold value, is connected upstream from the switching element.

\* \* \* \* \*